United States Patent Office 3,070,560
Patented Dec. 25, 1962

---

3,070,560
COMPOSITION COMPRISING A POLYSILOXANE RESIN, SILICA FILLER, A HYDROXYLATED SILOXANE, AND A BORON COMPOUND
Virgil L. Metevia, Bay City, Mich., assignor to Dow Corning Corporation, Midland, Mich., a corporation of Michigan
No Drawing. Filed Jan. 19, 1959, Ser. No. 787,325
2 Claims. (Cl. 260—29.1)

This invention relates to organosilicon rubber stocks of improved handling properties.

Organosiloxane rubbers came into commercial use about fifteen years prior to this invention. These first organo-silicon rubbers were of low tensile strength and elongation which severely hampered their use. The first major improvement in the physical strength of these rubbers was accomplished by combining linear polymers and finely divided silicas. The invention is described in U.S. Patent 2,541,137. However, it was found that in spite of the increased strength of the vulcanized rubber obtained by the use of these finely divided fillers a serious handling difficulty was introduced. This difficulty was caused by a premature hardening of the compounded silicone rubber which took place spontaneously upon mixing the filler and the polymer. This phenomenon was so serious that it was imperative that it be overcome before commercial utilization of improved silicone rubbers was feasible. Several methods were devised to overcome this problem.

One of the best of these was the discovery of new silicas which comprised finely divided silica, the surface of which was saturated with organosilyl groups in amount such that the ratio of organosilyl groups to $SiO_2$ of the silicas was at least .06. These fillers are fully described in U.S. Patent 2,863,846 of Leslie J. Tyler. The new Tyler fillers not only avoid the premature hardening of the filler-polymer mixture, but they also resulted in siloxane rubbers of even greater physical strength than could be accomplished with previously employed silica fillers. As a result the new filler-polymer combinations brought about by the Tyler invention have greatly increased the utility of silicone rubber.

However, with the expanding commercial use of these rubbers a defect in their handling properties came to life. The term "handling properties" as employed herein refers to the properties of the compounded rubber prior to vulcanization hereinafter called the "rubber stock." The difficulty was that the polymer and filler combinations proved to have very good adhesive qualities. As a result the rubber stock tended to adhere tenaciously to surfaces with which it came in contact. In fact, the adhesive strength of the rubber stock was often greater than the cohesive strength. These properties meant that the rubber stock stuck tenaciously to the rolls of a compounding mill, to the blades of mixers, to interleaving sheets for the rubber stock, to containers in which it was placed, and to the blades of calendering equipment. Whereas these adhesive qualities are excellent for many applications, they make calendering of the rubber stock quite difficult. As a result the field of use of the new and improved rubber was curtailed.

It is the object of this invention to provide a vulcanizable silicone rubber stock of improved handling properties. Another object is to provide a vulcanizable silicone rubber stock which has little adhesion to surfaces with which it comes in contact and which when vulcanized retains a high degree of physical strength. Another object is to provide an improved calendering, high strength silicone rubber. Other objects and advantages will be apparent from the following description.

This invention relates to a composition of matter of improved handling properties comprising (1) a diorganopolysiloxane being essentially of the unit formula $R_2SiO$ and having a viscosity of at least 10,000 cs. at 25° C., in which essentially all of the molecules are endblocked with $R_3Si—$ and $R'O—$ groups, in which siloxane both R and R' are selected from the group consisting of monovalent hydrocarbon radicals and halogenated monovalent hydrocarbon radicals of less than 10 C atoms, (2) from 10 to 100 parts based on 100 parts of (1) of a silica filler having a surface area of at least 50 square meters per gram and having attached to the surface thereof through SiOSi linkages organosilyl groups of the formula $R''_nSi$ in which $R''$ is a monovalent hydrocarbon or halogenated monovalent hydrocarbon radical of less than 7 C atoms and $n$ has an average value from 2 to 3 inclusive, in said filler (2) the ratio of organosilyl groups to $SiO_2$ units of the silica being at least .06, (3) from 1 to 20 parts based on 100 parts of (1) of a hydroxylated siloxane being essentially of the unit formula XYSiO in which X is methyl and Y is a hydrocarbon or halogenated hydrocarbon radical of less than 10 C atoms, (3) having at least 1% by weight silicon bonded OH groups and (4) from .015 to .25 part based on 100 parts of (1) of boron added in the form of alkyl borates, organosilyl borates, boric acid or boric oxide.

The essence of the present invention resides in the discovery that the use of a combination of hydroxylated siloxane (3) and boron compound (4) in the amounts specified will reduce the adhesiveness of the combination of (1) and (2) without seriously affecting the ultimate physical properties of the vulcanized composition. This reduction in adhesiveness of the raw silicone rubber stock is not obtained when either (3) or (4) are absent from the formulation or when they are present in amounts in excess of those stated above.

The compositions of this invention are prepared by mixing the four specified ingredients. If desired, the composition may contain other ingredients such as pigments, compression set additives, antioxidants, and any of the various vulcanizing catalysts employed with silicone rubbers. In carrying out the process of this invention the boron compound (4) should be added to the polymer (1) either simultaneously with or subsequent to the addition of the hydroxylated siloxane (3). If this precaution is not observed, undesirable interaction will take place between the polymer (1) and the boron compound (4). Aside from this precaution the order of addition or mixing of the ingredients is not critical.

For the purpose of this invention the organosiloxane polymer (1) can be any diorganosiloxane which is endblocked with either triorganosilyl units ($R_3Si—$) or hydrocarbonoxy units ($R'O—$). It is essential for the success of this invention that the diorganopolysiloxane be endblocked with one or both of these types of units. A diorganosiloxane having hydroxyl groups on the ends of the chain is not suitable for use in this invention.

For the purpose of this invention the diorganosiloxane (1) should have a viscosity of at least 10,000 cs. at 25° C. The upper limit of the viscosity is not critical although in general viscosities above 10,000,000 cs. do not add anything to the properties of the final rubber.

The term "being essentially of" when used in connection with siloxane (1) means that a majority of the units are of the specified formula. However, the term includes the presence of the endblocking units together with minor amounts, that is, less than about 1 mol percent monoorganosiloxane units.

The polysiloxanes (1) employed herein can be prepared by any of the conventional methods for preparing endblocked siloxanes. The best method is to equilibrate a diorganosiloxane with either a triorganosiloxane or a hydroxy compound of the formula R'OH in the presence of an alkaline catalyst such as sodium or potassium hydroxide. In those cases where R' is an aromatic hydrocarbon or halogenated aromatic hydrocarbon radical it is preferable that the polymers be prepared by an ester interchange between the corresponding phenol and an alkoxy endblocked diorganosiloxane polymer in which the alkoxy group is methoxy, ethoxy or isopropoxy.

For the purpose of this invention the diorganopolysiloxane (1) can contain any monovalent hydrocarbon substituents or halogenated monovalent hydrocarbon substituents having less than 10 C atoms. Specific examples of such substituents (that is R groups) are alkyl radicals such as methyl, ethyl, butyl, or decyl; alkenyl radicals such as vinyl, allyl, and hexenyl; cycloaliphatic radicals such as cyclopentyl and cyclohexyl; aralkyl hydrocarbon radicals such as benzyl and β-phenylethyl; and aromatic hydrocarbon radicals such as phenyl, xenyl and tolyl. R can also be any halogenated monovalent hydrocarbon radical such as chloromethyl, chlorophenyl, bromophenyl, chloroxenyl, 3,3,3-trifluoropropyl, trifluorovinyl and $\alpha,\alpha,\alpha$-trifluorotolyl. Preferably at least 50% of the R groups are methyl.

The R' groups can also be any of the above radicals. Thus (R'O—) can be, for example, alkoxy, phenoxy, haloalkoxy, halophenoxy, cresoxy, allyloxy, and cyclohexyloxy.

The fillers employed in this invention are best prepared by the method described in the aforesaid Tyler patent and by the method of the Tyler copending application Serial No. 460,773, filed October 6, 1954. These fillers have surface areas of at least 50 square meters per gram and in general from 200 to 700 square meters per gram and are characterized by having organosilyl groups attached to the surface thereof through SiOSi linkages. These organosilyl groups are of the formula $R''_n Si$ in which R'' is any monovalent hydrocarbon or halogenated monovalent hydrocarbon radical of less than 7 C atoms, while $n$ has an average value from 2 to 3 inclusive.

Thus the type of organosilyl units which can be attached to the silica are dimethylsilyl units, trimethylsilyl units, diethylsilyl units, hexylmethylsilyl units, vinylmethylsilyl units, vinyldimethylsilyl units, cyclohexylmethylsilyl units, phenyldimethylsilyl units, phenylmethylsilyl units, 3,3,3-trifluoropropylmethylsilyl units, 3,3,3-trifluoropropyldimethylsilyl units, chloromethyldimethylsilyl units, and chlorophenyldimethylsilyl units. It should be understood that the silica of this invention can have more than one type of silyl unit attached thereto. Thus, for example, the silica may have attached thereto both dimethylsilyl and methylvinylsilyl units.

Hydroxylated siloxane (3) which is employed herein can be prepared by any convenient method for preparing such siloxanes. These include heating cyclic siloxanes with steam under pressure and the careful hydrolysis of alkoxysilanes under relatively neutral conditions. Another method is that of preparing the corresponding chlorosiloxanes and then hydrolyzing the chlorine.

In order to be operative in this invention siloxane (3) must contain at least 1% by weight silicon-bonded hydroxyl groups. If desired, siloxane (3) can also contain small amounts of monoorganosiloxane units.

Also for the purpose of this invention X should be a methyl radical while Y can be any monovalent hydrocarbon radical or halogenated monovalent hydrocarbon radical of less than 10 C atoms such as those specified for R above.

The fourth essential ingredient of the compositions of this invention is boron. The boron may be added in the specified amounts in the form of any alkyl borate such as methyl borate, ethyl borate, propyl borate, butyl borate, or octadecyl borate or in the form of any organosilyl borate. The latter materials can be monomeric substances such as tris-trimethylsilyl borate, tris-triethylsilyl borate, tris-triphenylsilyl borate, trimethylsilyl-bistriethylsilylborate, tris-phenyldimethylsilyl borate, or the organosilyl borate can be a complex material such as that obtained by reacting alkyl borates with hydroxylated dimethylsiloxanes or by reacting boric oxide with cyclic diorganosiloxanes. The latter reaction is best carried out at temperatures from 150 to 200° C.

Obviously since the important ingredient is the boron the most economical process is to employ a low molecular weight boron compound such as methyl borate, ethyl borate, boric acid or boric oxide.

After mixing the ingredients of this invention, it is often desirable, but not essential, to heat them at temperatures of from 100 to 200° C. for from 1 to 3 hours. This heating process enhances the effect of the boron with the result that for any given formulation one can employ less boron when the heating step is carried out than when it is not. The precise amounts of filler, hydroxylated siloxane (3) and boron compound (4) employed in any particular formulation will vary within the limits specified depending upon the particular properties of the polymer-filler combination.

The compositions of this invention are cured to rubbers with any of the conventional vulcanizing agents normally employed with silicone rubbers. These include peroxides such as benzoyl peroxide, tertiary butylperbenzoate, chlorinated benzoyl peroxides, ditertiarybutylperoxide and dicumylperoxide; or combinations of alkyl silicates and metal salts of carboxylic acids; or of SiH containing siloxanes and metal salts of carboxylic acids; or combinations of vinyl containing siloxanes, SiH containing siloxanes and chloroplatinic acid.

The compositions of this invention can be employed to fabricate any desirable silicone rubber article. That is, they can be molded, extruded, or calendered and hence can be used in any of the applications for which silicone rubber is normally employed.

The adhesive test employed to evaluate the compositions of this invention was carried out by pressing the compositions to be tested between two sheets of polyethylene at room temperature at 5000 p.s.i. for 5 seconds. The laminate was then cut into strips one inch wide and allowed to stand at room temperature for 1 day. The strips were then put into a jig and the polyethylene was pulled away from the surface of the composition in a Scott tester at a rate of 20 inches per minute. The force required was recorded in grams per inch of width.

All of the compression set data shown below was determined by subjecting the sample to the standard compression for 22 hours at 150° C.

The following examples are illustrative only and should not be construed as limiting the invention which is properly delineated in the appended claims. All parts are parts by weight. The term "saturated" when used in connection with the silica fillers means that the ratio of organosilyl groups to $SiO_2$ of the silica is at least .06.

*Example 1*

100 parts of a vinyldimethylsilyl endblocked copolymer gum of dimethylsiloxane, methylvinylsiloxane and phenylmethylsiloxane containing about .14 mol percent methylvinylsiloxane and about 7 mol percent phenylmethylsiloxane were milled with 60 parts of a filler having a surface area of about 325 square meters per gram, said surface being saturated with trimethylsilyl units attached thereto through SiOSi linkages and 10 parts of a hydroxylated dimethylpolysiloxane fluid containing 3.5% silicon-bonded hydroxyl groups. The material was then milled with 1.5 parts of ethyl borate, 2.5 parts dichlorobenzoylperoxide and .6 part tertiary-butylperbenzoate.

The adhesion of the compounded stock was then tested as described above and was found to be 5 grams.

The resulting formulation was then vulcanized by heating in a press 5 minutes at 125° C. and then in an oven 1 hour at 150° C. and then 24 hours at 250° C. The properties were as follows: durometer 76, tensile strength 1007 p.s.i., and elongation at break 403%.

An identical formulation with the exception that no ethyl borate was added was compounded in the same manner. The cohesive strength of the stock was so low that no adhesion test could be run. After vulcanization as shown above the properties were as follows: durometer 71, tensile strength 1148 p.s.i. and elongation at break 453%.

When both the hydroxylated dimethylpolysiloxane fluid and the ethyl borate were left out of the above formulation the adhesion was 40 g. and after vulcanization as shown above the properties were as follows: durometer 70, tensile strength 1032 p.s.i. and elongation at break 375%.

*Example 2*

100 parts of a vinyldimethylsilyl endblocked dimethylpolysiloxane gum were milled with 60 parts of a silica having a surface area of about 300 square meters per gram and its surface saturated with dimethylsilyl units attached to the silica by SiOSi linkages, 5 parts of a hydroxylated dimethylpolysiloxane fluid containing 3.5% by weight silicon-bonded hydroxyl groups and 1 part ethyl borate. The mixture was heated 2 hours at 150° C. .5 part of tertiary-butylperbenzoate was then milled into the stock. The adhesion after 1 day was 7 grams. The resulting material was then cured in a press 10 minutes at 150° C. and then in an oven 1 hour at 150° C. and 24 hours at 250° C. The resulting material had the following properties: durometer 62, tensile strength 1377 p.s.i., elongation at break 557%, tension set 30%, and compression set 40%.

*Example 3*

100 parts of the polymer of Example 2 were milled with 60 parts of a silica filler having a surface area of about 325 square meters per gram, which surface was saturated with a combination of vinylmethylsilyl units and trimethylsilyl units attached thereto through SiOSi linkages, 5 parts of the hydroxylated siloxane of Example 2, 1 part ethyl borate and .5 part tertiary-butylperbenzoate. The adhesion was found to be 10 grams. The material was then vulcanized as in Example 2 and found to have the following properties: durometer 69, tensile strength 1280 p.s.i., elongation at break 400%, tension set 10%, and compression set 29%.

*Example 4*

A composition was prepared by milling 100 parts of the copolymer gum of Example 1, 60 parts of the filler of Example 3, 20 parts of the hydroxylated siloxane of Example 2, 3 parts ethyl borate, and .5 part tertiarybutylperbenzoate. This material was found to have an adhesion of 2 grams.

*Example 5*

100 parts of the copolymer gum of Example 1 were milled with 60 parts of the silica filler of Example 3, 5 parts of a hydroxyl endblocked phenylmethylpolysiloxane fluid containing 4% by weight silicon-bonded hydroxyls, 1 part ethyl borate, and .5 part tertiary-butylperbenzoate. The composition had an adhesion of 14 grams and after vulcanization by the method of Example 2, it had the following properties: durometer 72, tensile strength 1465 p.s.i., elongation at break 480%, tension set 23%, and compression set 27%.

*Example 6*

100 parts of the polymer of Example 1 were milled with 60 parts of the filler of that example, 3 parts of the hydroxylated siloxane of Example 2, 1 part methyl borate, 2.5 parts dichlorobenzoylperoxide and .6 part tertiarybutylperbenzoate. The sample had an adhesion of 15 grams which contrasts to an adhesion of 98 grams for an identical composition minus the methyl borate.

The composition was vulcanized according to the procedure of Example 2 and found to have the following properties: durometer 62, tensile strength 980 p.s.i., elongation at break 430%, tension set 34%, and compression set 36.5%.

*Example 7*

The procedure of Example 6 was repeated except that 2 parts of tris-trimethylsilylborate was employed in the place of the methylborate. The resulting material had an adhesion of 22 grams and when vulcanized had the following properties: durometer 62, tensile strength 915 p.s.i., elongation at break 470%, tension set 47%, and compression set 47.5%.

*Example 8*

Improved handling is obtained when the following compositions are prepared. In each case the proportions are 100 parts (1), 80 parts (2), 5 parts (3) and enough of (4) to give .05 part boron.

| | (1) | (2) | (3) | (4) |
|---|---|---|---|---|
| I | A 30,000 cs. ethoxy endblocked phenylmethylpolysiloxane. | A silica having a surface area of 150 sq. meters per gram and having phenyldimethylsilyl groups saturating the saurfce thereof and being attached to the silica by SiOSi linkages. | A hydroxyl endblocked vinylmethylsiloxane having 2% silicon-bonded OH. | Boric acid. |
| II | A β-chloroethoxy endblocked copolymer gum of 90 mol percent dimethylsiloxane, 5 mol percent hexylmethylsiloxane and 5 mol percent α,α,α-trifluorotolylmethylsiloxane. | The silica of Example 1. | The hydroxylated fluid of Example 1. | $B_2O_3$. |
| III | A 3,3,3-trifluoropropyldimethylsilyl endblocked 3,3,3-trifluoropropylmethylsiloxane gum. | A silica having a surface area of 200 sq. meters per gram which surface is saturated with $CH_3$ $CF_3CH_2CH_2Si\equiv$ units which are attached to the silica by SiOSi linkages. | $HO\left[\begin{array}{c}CF_3\\CH_2\\CH_2\\SiO\\CH_3\end{array}\right]_n H$ where n is 10. | Ethyl borate. |
| IV | A phenoxy endblocked dimethylpolysiloxane gum. | The silica of Example 1. | The hydroxylated fluid of Example 1. | A dimethyl silylborate made by reacting equal parts by weight of $B_2O_3$ and $[(CH_3)_2SiO]_4$ at 150° C. |

That which is claimed is:

1. A composition of matter of improved handling properties comprising (1) a diorganopolysiloxane being essentially of the unit formula $R_2SiO$ and having a viscosity of at least 10,000 cs. at 25° C., in which essentially all of the molecules are endblocked with radicals selected from the group consisting of $R_3Si-$ and $R'O-$ groups, in which siloxane both R and R' are selected from the group consisting of monovalent hydrocarbon radicals and halogenated monovalent hydrocarbon radicals of less than 10 C atoms, (2) from 10 to 100 parts based on 100 parts of (1) of a silica filler having a surface area of at least 50 square meters per gram and having attached to the surface thereof through SiOSi linkages organosilyl groups of the formula $R''_nSi$ in which R'' is selected from the group consisting of monovalent hydrocarbon and halogenated monovalent hydrocarbon radicals of less than 7 C atoms and $n$ has an average value from 2 to 3 inclusive, in said filler (2) the ratio of organosilyl groups of $SiO_2$ units of the silica being at least .06, (3) from 1 to 20 parts based on 100 parts of (1) of a hydroxylated siloxane being essentially of the unit formula XYSiO in which X is methyl and Y is selected from the group consisting of monovalent hydrocarbon and halogenated monovalent hydrocarbon radicals of less than 10 C atoms, (3) having at least 1% by weight silicon-bonded OH groups and (4) from .015 to .25 part based on 100 parts of (1) of boron added in the form of a compound of the group consisting of alkyl borates, organosilyl borates, boric acid and boric oxide.

2. A composition in accordance with claim 1 which also contains a vulcanizing agent.

References Cited in the file of this patent

UNITED STATES PATENTS

| | | |
|---|---|---|
| 2,721,857 | Dickmann | Oct. 25, 1955 |
| 2,863,846 | Tyler | Dec. 9, 1958 |
| 2,890,188 | Konkle et al. | June 9, 1959 |

FOREIGN PATENTS

| | | |
|---|---|---|
| 781,488 | Great Britain | Aug. 21, 1957 |
| 552,253 | Canada | Jan. 28, 1958 |